No. 677,822. Patented July 2, 1901.
J. H. TOOF.
APPARATUS FOR TREATING STARCH.
(Application filed Jan. 18, 1900.)
(No Model.) 2 Sheets—Sheet 1.
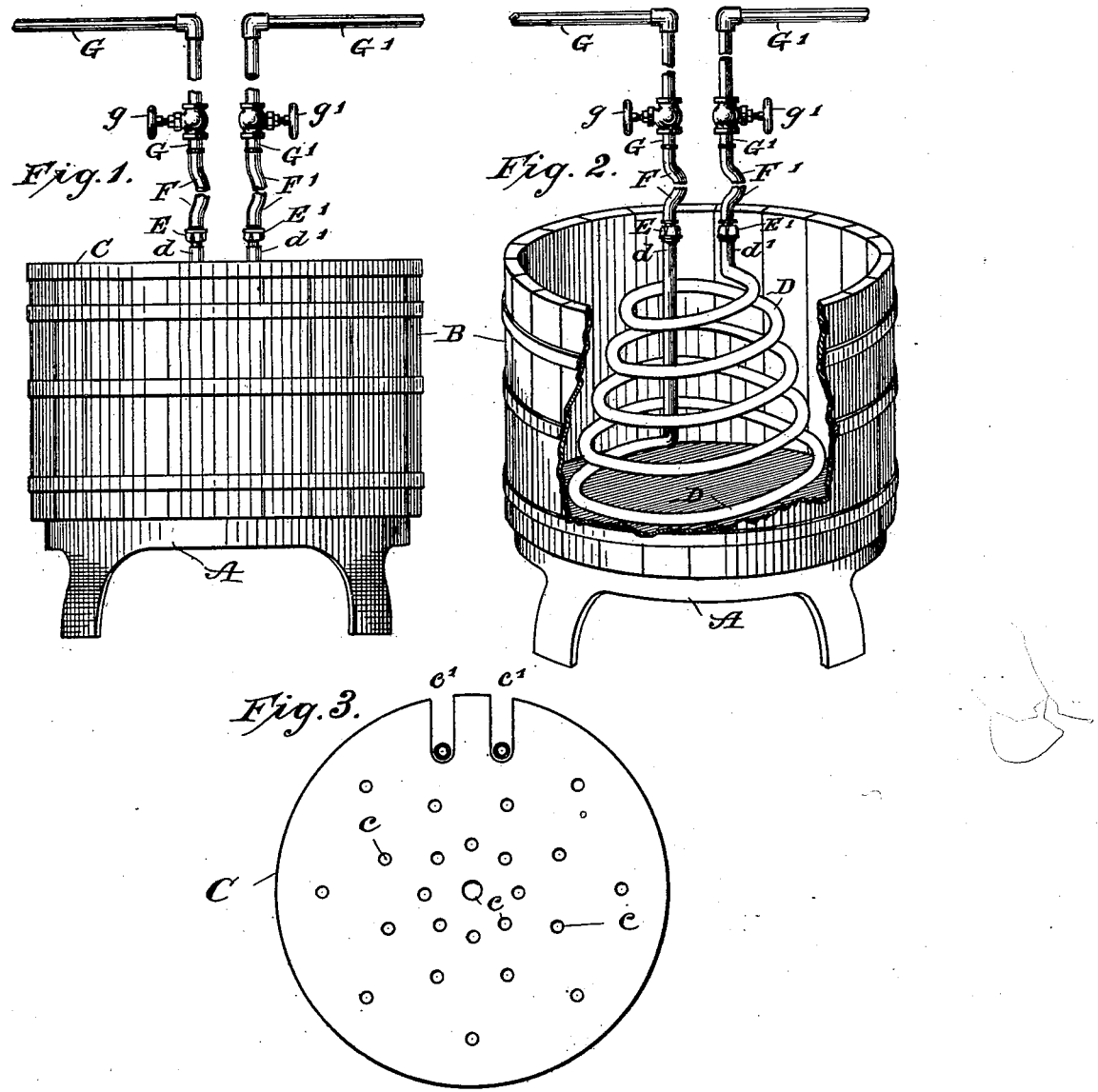

No. 677,822. Patented July 2, 1901.
J. H. TOOF.
APPARATUS FOR TREATING STARCH.
(Application filed Jan. 18, 1900.)
(No Model.) 2 Sheets—Sheet 2.
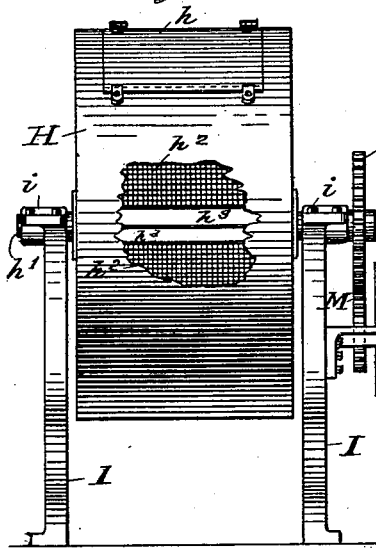
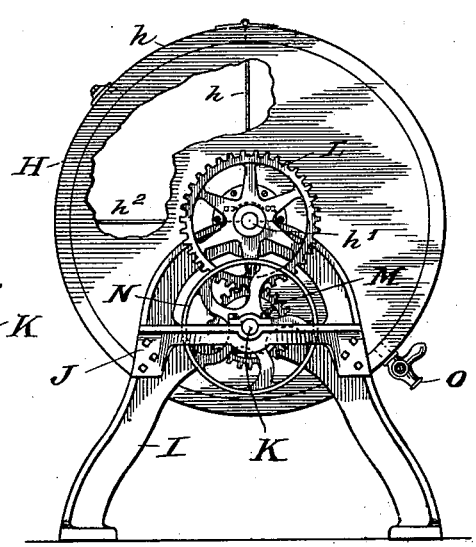
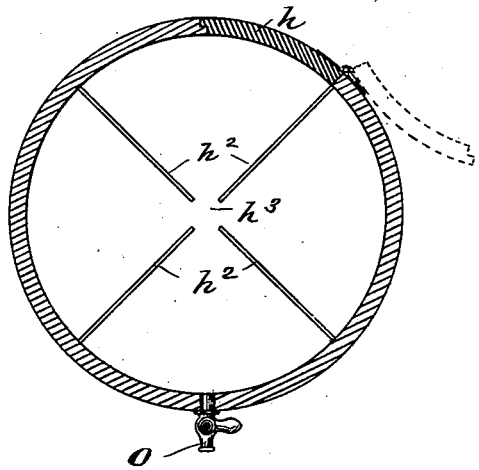
Witnesses
Bayard C. Ryder
William H. Drury
Inventor
John H. Toof
By his Attorney

UNITED STATES PATENT OFFICE.

JOHN H. TOOF, OF CONCORD, NEW HAMPSHIRE.

APPARATUS FOR TREATING STARCH.

SPECIFICATION forming part of Letters Patent No. 677,822, dated July 2, 1901.

Application filed January 18, 1900. Serial No. 1,833. (No model.)

*To all whom it may concern:*

Be it known that I, JOHN H. TOOF, a citizen of the United States, residing at Concord, in the county of Merrimack and State of New Hampshire, have invented certain new and useful Improvements in Apparatus for Treating Starch; and I do hereby declare the following to be a full, clear, and exact description of the invention, such as will enable others skilled in the art to which it appertains to make and use the same.

This invention relates to apparatus for treating boiled starch, whereby its consistency is readily changed from that of a jelly to a liquid.

As at present used in laundries starch is so sticky and dauby that most everything in the place shows evidence of its presence in the way of dry scales, and any machines in which starch is used become so badly stuck up in a few hours as to necessitate stopping them in order that they may be cleaned.

The object of the present invention is to provide an apparatus by means of which starch after having been boiled in the usual manner may be transformed in character from that of a jelly to a liquid, retaining all its strength and losing most of its sticky glutinous quality.

The invention consists of apparatus in which the starch after becoming cool may be reduced to a liquid state by beating, or any suitable method of agitation, as will be fully set forth in the following specification and claim, and clearly illustrated in the drawings accompanying and forming a part of the same, of which—

Figure 1 represents a starch-cooling vessel in elevation, Fig. 2 being a broken perspective view of the same, having its cover removed for disclosing the cold-water-circulating coil. Fig. 3 is a plan view of the cover of the cooling vessel. Fig. 4 is a broken front elevation of the starch-agitator. Fig. 5 is a broken end elevation of the agitator, showing gearing and belt-pulleys for rotating the same. Fig. 6 is a vertical section of the agitator.

Similar reference-letters denote corresponding parts in all the views.

A is a suitable base which supports the cooling vessel B, and C is its cover.

D is a detachable cold-water-circulating coil which is placed in the cooling vessel B, and for convenient removal it is preferable to connect it with the cold water supply and discharge pipes by means of flexible pipes, as seen in Figs. 1 and 2. For convenience, also, the terminals of the coil, as seen at $d$ $d'$, are bent upward to a point above the top of the vessel, the terminal $d$ leading vertically from the bottom of the coil D and the terminal $d'$ from the top of said coil. The terminal $d$ is coupled at E to a piece of hose-pipe F and the terminal $d'$ to a piece of hose-pipe F', and said hose-pipes are attached, respectively, to the cold water supply and discharge pipes G G', which are provided with a valve, as shown, respectively, at $g$ $g'$.

If preferred, the starch may be cooled in the vessel in which it is boiled by placing therein the cold-water-circulating coil D, in which case the vessel B will of necessity be formed of metal.

The cover C should be provided with perforations, as at $c$, so as to allow all surplus steam to escape and not retard the rapid cooling of the starch; and said cover will also be provided with openings $c'$ through its edge, so as to admit the terminals $d$ $d'$ of the cold-water-circulating coil, and thus make it possible to remove the cover or to place it in position without the necessity of uncoupling the coil from the pipes F F'.

It is not absolutely necessary to provide a cover for the vessel B, but its use prevents a certain amount of waste, as a crust would otherwise form upon the top of the starch, and this would have to be removed and thrown away. On the other hand, a tight cover would greatly lengthen the time consumed in cooling the starch. Hence I prefer to provide a limited number of perforations in the cover to allow the heat to escape without exposing the surface of the starch wholly to the action of the air.

When the starch is cooled, which by this apparatus can be accomplished very quickly, the coil D is removed, and the starch may be dipped out and transferred in desired quantities to the agitating vessel or transformer, and this may resemble an ordinary churn or may consist of a rotary cylindrical vessel H, having an opening provided with a cover $h$, adapted to be firmly sealed, said vessel being provided with journals $h'$ at its ends, mounted in bearings $i\ i$ of the supports I I. The vessel H is provided with perforated partitions or partitions formed of wire screening $h^2$, as shown best in Fig. 4, against which screens the starch will fall by reason of the rotative motion of the vessel. In Figs. 4 and 6 it will be noticed that these partitions are not continuous—i. e., do not extend from side to side of the vessel—there being a space $h^3$ in the center of the vessel between the several partitions, the reason for which is that in practice I found that when the vessel receives its charge of cooled starch and is closed and set in motion the starch is so thick that but a small proportion would find its way through the screens during the first hour or more of the operation of the vessel, but by leaving the opening or space $h^3$, as shown, the starch that does not work through a given screen will fall through the space $h^3$ upon another screen and thus hasten the mixing or beating process.

Upon one of the journals $h'$ is mounted a gear-wheel L, and upon one of the supports I is attached a bracket J, and a shaft K is mounted in suitable bearings, one upon the support I and the other upon said bracket J, the latter being seen at $j$, and upon said shaft is carried a pinion M, meshing with said gear L, and driving-pulleys N, over which a driving-belt may pass to a driving-pulley of proper size above or below the machine, as may be convenient, for rotating the same at the desired speed—to wit, about fifteen revolutions per minute.

When the contents of the agitator has been reduced to a liquid, it is drawn off as required for use into a pail by means of a suitable valve or faucet O; but it may be kept in the vessel H for more than a week without danger of becoming sour, and it may be heated without changing its character, for when again allowed to cool it is still in a liquid state.

One of the great advantages gained by using this apparatus is that it reduces the starch to a consistency which may easily be impregnated into any and all articles to be starched and that it loses none of its strength, making the articles just as stiff as they would be if starched with the ordinary thick starch.

My purpose is to reduce the mass to a finely-divided condition and not merely to lift it for the purpose of mixing. In this process of reduction or division the perforated plates or screens are used, and in order to prevent the accumulation of undivided portions against the screen-surface the opening at the center is provided to allow the lumps or undivided mass to pass from one compartment to the other.

The apparatus disclosed herein is particularly adapted to carry out the process described in my application for Letters Patent of the United States for process for treating starch, filed January 18, 1900, Serial No. 1,834.

Having described my improved apparatus, what I claim is—

1. An apparatus for treating starch consisting in a drum having a series of screen-partitions extending from its inner periphery to near its center, leaving said center open for the passage of starch from one partition to the other entirely around the cylinder, substantially as described.

2. An apparatus for treating starch consisting in a drum having a series of screen-partitions extending from its inner periphery to near its center, leaving said center open for the passage of starch from one partition to the other entirely around the cylinder and an opening leading to the space between two of the partitions, said opening being closed by a cover, substantially as described.

In testimony whereof I affix my signature in presence of two witnesses.

JOHN H. TOOF.

Witnesses:
J. B. THURSTON,
EMILE H. TARDIVEL.